(12) United States Patent
Billiet et al.

(10) Patent No.: US 6,770,242 B2
(45) Date of Patent: *Aug. 3, 2004

(54) VOICE COIL MOTOR MAGNETS AND METHOD OF FABRICATION THEREOF

(76) Inventors: Romain L. Billiet, 135A Malacca Street, Penang (MY), 10400; Hanh T. Nguyen, 135A Malacca Street, Penang (MY), 10400

( * ) Notice: Subject to any disclaimer, the term of this patent is extended or adjusted under 35 U.S.C. 154(b) by 117 days.

This patent is subject to a terminal disclaimer.

(21) Appl. No.: 10/139,462

(22) Filed: Apr. 26, 2002

(65) Prior Publication Data

US 2002/0197179 A1 Dec. 26, 2002

Related U.S. Application Data

(60) Provisional application No. 60/289,198, filed on May 8, 2001.

(51) Int. Cl.7 ............................ B22F 1/00; B22F 3/12
(52) U.S. Cl. ..................... 419/33; 419/36; 148/105; 148/108; 148/513
(58) Field of Search ................. 419/33, 36, 32, 419/37; 148/105, 108, 513

(56) References Cited

U.S. PATENT DOCUMENTS

| | | | |
|---|---|---|---|
| 4,585,473 A | * | 4/1986 | Narasimhan et al. ...... 75/0.5 C |
| 4,678,634 A | | 7/1987 | Tawara et al. |
| 4,795,598 A | * | 1/1989 | Billiet ....................... 264/40.6 |
| 4,818,305 A | | 4/1989 | Steingroever |
| 5,621,591 A | | 4/1997 | Rahimi et al. |
| 5,872,688 A | | 2/1999 | Battu et al. |
| 6,157,099 A | | 12/2000 | Hartman |
| 2002/0179185 A1 | * | 12/2002 | Billiet et al. ................. 148/105 |

* cited by examiner

*Primary Examiner*—Daniel Jenkins
(74) *Attorney, Agent, or Firm*—Foley and Lardner

(57) ABSTRACT

Permanent magnet for voice coil actuator motors used to actuate head-arm assemblies in small form disk drives are produced from a dispersion of prealloyed rare earth magnetic particles in a thermoplastic binder. Upon shaping of green parts the magnetic axis of the particles is aligned with the field lines of a magnetic field. Following extraction of the binder the green parts are sintered to net shape. Improved magnetic properties, smaller dimensions, better than tolerances and 100% material utilization are claimed.

7 Claims, No Drawings

VOICE COIL MOTOR MAGNETS AND METHOD OF FABRICATION THEREOF

CROSS-REFERENCE TO RELATED APPLICATIONS

This application claims priority to U.S. Provisional Patent Application Serial No. 60/289,198 filed on May 08, 2001.

This invention is related to U.S. patent application Ser. No. 10/101024 entitled: 'Rare Earth Magnet Rotors For Watch Movements And Method Of Fabrication Thereof' and to U.S. patent application Ser. No. 10/078070 entitled: 'Method For Making Articles From Nanoparticulate Materials'.

REFERENCES CITED

| | | | |
|---|---|---|---|
| 4,678,634 | 07/1987 | Tawara et al. | 419/30 |
| 4,818,305 | 04/1989 | Steingroever | 148/103 |
| 5,621,591 | 04/1997 | Rahimi et al. | 360/106 |
| 5,872,688 | 02/1999 | Battu et al. | 360/106 |
| 6,157,099 | 12/2000 | Hartman | 310/13 |

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

1. Field of Invention

The present invention relates to rare earth permanent magnets. More specifically, the present invention relates to rare earth permanent magnets for voice coil actuator motors used to actuate head-arm assemblies in small form factor disk drives.

2. Description of Prior Art

The rapidly expanding use of personal computers and the ensuing demand for increased functionality, performance and portability, places tremendous demands on the disk drive systems of such computers.

The major improvement in this direction has been the development of Winchester type disk drive systems in replacement of the earlier used floppy disk drive systems. The former provide much higher capacity and faster speed of operation, factors which are of great importance for the effectiveness of personal computers running advanced software packages.

Winchester disk drives typically utilize a plurality of rotating storage disks and data tranducers to interact with each storage disk. An E-block having a plurality of spaced apart actuator arms maintains the data transducers proximate to each storage disk. Typically, a voice coil motor (VCM) is used for actuating the E-block and the data transducers relative to the storage disks.

The portability requirement of notebook computers places a premium on the 'form factor', the overall dimensions of the hermetic enclosure housing the disk drive. As a result, space available to lodge the VCM is limited. This situation inherently requires the use of smaller VCM magnets. Unfortunately, this in turn reduces the strength of the magnets and increases data retrieval time as the efficiency of the actuator motor is directly proportional to the strength of the VCM magnets.

The need to rapidly access information has further led to disk drives having storage disks which are rotated at ever increasing speeds and requiring an actuator motor which moves the E-block at ever increasing rates. Unfortunately, this typically results in increased heat, noise and power consumption of the disk drive.

VCM magnets must also hold their strength under adverse conditions, lest they will change in their performance. Hence, high coercivity and temperature stability are essential. Finally, in order to reduce the magnet volume and weight, it is important that the magnets have the highest possible energy product (BHmax).

Only the sintered rare earth permanent magnet materials samarium-cobalt, $Sm_2Co_{17}$, and neodymium-iron-boron, $Nd_2Fe_{14}B$—usually shortened to just NdFeB,—have energy products greater than 22MGOe (170 kJ/m3) and are used to machine VCM magnets. The amount of machining depends on the shape—usually arch-shaped flats or vertical sections of a cylinder—and on the dimensional tolerances of the magnets.

Sintered rare earth magnets are anisotropic and must be magnetized in the orientation direction. Hence, the provision of a prealloyed powder is a prerequisite. The process starts by vacuum induction melting a carefully optimized blend of alloying ingredients and casting an ingot. The ingot is then crushed under protective atmosphere to a coarse, typically minus 50 mesh (297 micron) prealloyed powder. The resulting powder is further coarse ground, and finally jet milled under high pressure (about 120 psi) $N_2$ to a critical size depending on the size of individual crystallites. Following screening to remove undesirable undersize and oversize particles the highly pyrophoric powder is stored under argon atmosphere until ready for pressing.

Pressing starts by blending a powder mixture based on chromatography results. Depending on the type of magnet being produced, the powder is either isostatically pressed into a block or die pressed into a particular component shape. In either case the operation is conducted in a pulsed magnetic field (typically 10 kOe). The effectiveness of the pulses in magnetically aligning the crystallites diminishes as the powder is being compacted. During the latter part of the pressing step, stresses introduced as a result of plastic deformation as well as density gradients may lead to a less than perfect grain alignment. In the VCM this non-linearity translates in difficulty in precisely moving the coil. Inaccurate positioning of the coil leads to data transfer errors between the data transducers and the storage disks.

After pressing, the block or shapes are demagnetized, followed by sintering in high vacuum. The partial formation of liquid phase during sintering affects the angularity tolerance of the magnetization. This fact, combined with the aforementioned imperfect grain alignment results in difficulties to achieve the theoretical maximum energy product.

Sintering is followed by quenching and aging. The intrinsic coercivity is defined during the quenching step. The presence of large amounts of non-magnetic secondary phase adversely affects the energy product. The sintered ingots are diamond-sawed to the required dimensions and ground to the required tolerance. The blocks are normally pulse magnetized at 40–50 kOe before being shipped. In the case of VCM magnets, magnetization of the final machined product usually takes place at the disk drive assembly plant.

As can be inferred from above, the prior art process of making sintered rare earth VCM magnets is labor-intensive and wasteful in terms of material and energy utilization.

BRIEF SUMMARY OF THE INVENTION

In accordance with the present invention the labor-intensive and inefficient techniques of the prior art are substantially overcome by forming VCM magnets from a mixture of prealloyed rare earth magnetic particles and a thermoplastic binder. Green VCM magnets are produced by either casting the mixture into a tape in a magnetic field, followed by blanking of the rotors, by extrusion or by injection molding the mixture in a mold cavity placed in a magnetic field. Following extraction of the binder the green parts are sintered to net shape. Improved magnetic properties, smaller dimensions, better tolerances and 100% material utilization are thus achieved.

OBJECTS AND ADVANTAGES

It is a primary object of this invention to provide an economic, simple, energy and material efficient process to mass-produce VCM magnets An additional object of this invention is to provide a method to fabricate VCM magnets that are smaller in size and to a greater dimensional accuracy than in the prior art.

Fine prealloyed rare earth magnet powder being extremely reactive and pyrophoric, sintering of the prior art magnets is necessarily performed as soon as possible after the cast ingot has been crushed and milled into a powder. As a result, the operations of vacuum induction melting, casting, comminution, pressing and sintering of the rare earth alloy are of necessity carried out in the same facilities. This situation has lead to a virtual monopoly over rare earth magnet manufacturing by only a handful of manufacturers. It is an object of this invention to break this monopoly and to reduce the end user's dependence on suppliers of sintered permanent magnet ingots and shapes. Raw rare earth materials in solid or powder form can be easily obtained from suppliers who are not magnet producers themselves. Likewise raw non-rare earth alloy constituents like iron or cobalt in granules, flakes or powder can be easily procured. The ability to source the raw materials from non-magnet producers inherently results in substantial cost reductions. The rare earth alloy can be cast by any foundry equipped with a vacuum induction furnace. Likewise crushing and rough grinding of the cast ingot does not represent any problem since it is only the fine jet milled powder that becomes pyrophoric. Hence this invention has the potential to dramatically reduce the raw material cost for rare earth magnets.

Conventional isostatic pressing of rare earth ingots or shapes in a magnetic field is done with bulky presses which represent a sizeable investment. This invention does not require such investment. Furthermore, as no pressing is involved there are no stresses nor density gradients.

In summary, this invention bypasses the rare earth powder pressing, ingot sintering and machining process, replacing it with a simple, economical, zero-waste and environmentally clean process eminently suited to automation.

Finally this invention allows for higher energy products to be realized than by using the prior art methodology as magnetic alignment of the particulates is optimized. The reason will become apparent from a comparison with the prior art technique of injection molding of bonded plastic magnets, where an orienting fixture creates a magnetic field having field lines which pass through the mold cavity, the field lines orienting the magnet powder particles in the mold cavity. In this technique, the magnetic alignment of the particles can be considerably higher and more uniform than in isostatically pressed magnets, even without applying a particularly strong magnetic field. Of course, the performance of a plastic magnet can never be so high as that of a sintered permanent magnet because a plastic magnet comprises the non-magnetic binder resin in a considerably high volume fraction. For example, the maximum energy product (BHmax) of a plastic magnet composed of a magnetic powder and a binder resin in a volume ratio of 70:30 is sometimes only about 50% or even smaller compared to that of the sintered magnet prepared of the same magnetic powder.

Hence, the application of this invention results in VCM magnets with more uniform, higher average and more linear magnetic flux densities. The higher magnetic flux densities create higher seek forces and the higher linear flux densities result in accurate movement of the actuator motor. Additionally, the more uniform and higher flux densities result in higher torque on the coil of the actuator motor, enabling the magnet to generate more force from a given amount of current in the coil and increasing the efficiency of the actuator motor. This also reduces the amount of power consumed by the motor as well as the amount of heat and noise generated by the motor during operation while simultaneously increasing the operational time of the motor for a given battery charge. Further, the size of the magnet can be reduced for a given force requirement. These considerations are particularly important for computer disk drives, which often operate in heat and noise sensitive environments, or on battery power.

It is, therefore, a further object of this invention to provide a VCM with improved efficiency, accuracy and performance.

BRIEF DESCRIPTION OF THE SEVERAL VIEWS OF THE DRAWINGS

Not applicable.

DETAILED DESCRIPTION OF THE INVENTION

At the outset, it should be understood that while the discussion of the specific embodiments of the invention will be provided mainly with reference to the rare earth materials such as NdFeB and SmCo, many other magnetic alloys like the so-called modified NdFeB, gadolium-added $Sm_2Co_{17}$, samarium-iron-nitride, $Sm_2Fe_{17}N_3$, or the so-called ferrite neo-hybrids, etc., can also be made.

Essentially this invention is based on producing a moldable compound from which green VCM magnets can be formed either by blanking them from a tape cast in a magnetic field or by injection molding them in a mold cavity placed in a magnetic field.

In either case the moldable compound must meet a number of essential requirements. First, the magnetic particles need to be brought as closely as possible in contact with each other, i.e. the green density must be maximized. The higher the green density the smaller the shrinkage upon sintering and the better the control over the final dimensions of the end product. The green density must also be isotropic to avoid density gradients upon sintering. Furthermore, the green mixture or slip must have the proper rheology to allow it to be extruded, tape cast or injection molded. Finally, prior to shaping of the green VCM magnets, the compound's viscosity must be low enough so as to allow the magnetic particles sufficient freedom of motion so that they will tend to align their magnetic axis under the influence of a pulsating magnetic field.

Obtaining a dispersion of magnetic particles with a high green density and optimized rheology for extruding, tape casting or molding is facilitated by following the precepts provided in these inventors' patent application Ser. No. 10/078070 entitled: Method For Making Articles From Nanoparticulate Materials.

In a first step of applying this invention, raw prealloyed materials conforming as closely as possible to the desired end specification of the rare earth material are obtained. The raw materials should be in particulate form with a particle size acceptable to an attrition mill. For example, a suitable starting material is the minus 50 mesh crushed material of the prior art.

The duration and intensity of the ball milling or mechanical attrition action, and consequently the final particle size distribution of the particulates will be dictated by the targeted magnetic properties. Hence the final particle size will be different depending of the type of magnet material to be produced, e.g. $Sm_2Co_{17}$, $SmCo_5$, NdFeB, etc.

Following attrition and deaggregation the magnetic particulates are desorbed under high vacuum following which 25–50% of the particle surface is coated with a monolayer of surfactant. The thus partially surfactant-coated magnetic particles are dispersed in a measured volume of a thermoplastic matrix to yield a mixture that can be tape cast, extruded or injection molded. Other forming techniques, e.g. calendering, laminating, etc., may also be used but do not constitute a deviation from the principles of this invention.

The tape casting or doctor blade casting machine is of the type used to produce ceramic substrates for the electronics industry. The slip viscosity is adjusted by the judicious use of plasticizers. The tape is cast onto a moving cellulose acetate carrier film. The height of the doctor blade is adjusted by means of micrometer screws to produce the desired thickness upon sintering.

Immediately upon emerging from the doctor blade the acetate film passes across the gap of an electromagnet where a strong pulsing magnetic field exerts a torque on the magnetic particles in the tape, inducing their alignment with the field lines. The frequency and intensity of the magnetic pulses are adjusted so as to produce a jigging action on the particles causing their magnetic axis to align with the field lines of the magnetic field. The manufacturing of pulse magnetizing fixtures for magnetization of the magnet body may be accomplished by a number of techniques well known to designers of magnetizing fixtures, including upper and lower magnetizing conductors and shaped steel magnetizing yokes.

In the case of extrusion, the viscosity of the thermoplastic compound is adjusted so that a tape or other suitable shape can be extruded. The extrusion nozzle can be located directly between the poles of the electromagnet. Alternatively the space in the gap itself can be configured so that it can serve as an extrusion nozzle.

In the case of injection molding magnetization takes place in the mold cavity itself in much the same way as is done for plastic IM (Injection Molded) bonded rare earth magnets.

Simultaneously with or immediately following magnetic alignment, the mobility of the magnetic particles is impaired by rapidly increasing the viscosity of the tape, extrusion or molding. In the case of tape casting this is normally done by 'drying' the tape, i.e. removing part or all of one or several of the binder constituents. The incorporation of a UV curable agent in the binder formulation and use of ultraviolet radiation at this point is an option. In the case of tape extrusion or injection molding, the increase in viscosity is normally achieved by cooling.

As soon as the tape becomes semi-solid green VCM magnets are punched from it to an oversize dimension allowing for shrinkage during firing. Any unused green tape can be recycled, resulting in 100% material utilization.

Techniques for dewaxing and sintering of green rotors are well described in the prior art and will not be elaborated on here.

Conclusion, Ramifications and Scope

In conclusion, the major advantage of this invention resides in the ability to economically mass-produce VCM magnets.

The practical uses of this invention are clearly broad in scope and universal and attempting to enumerate them all would not materially contribute to the description of this invention. For example, the ability to fabricate a multitude of products from a variety of magnetic materials via a plastic forming process such as tape casting or extrusion rather than by machining same from bulk alloys has far reaching applications in virtually every field of industry.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim as our invention:

1. A method for producing permanent rare earth magnets used in voice control actuator motors comprising the steps of:
   a. providing prealloyed rare earth magnetic alloys in particulate form,
   b. attriting a predetermined volume of said prealloyed rare earth particulate materials under a protective non-reactive fluid blanket having substantially higher density than that of water, with the dual purpose of breaking up any aggregates and of mechanically removing any adsorbed volatiles, moisture, atmospheric gases or contaminants from the surface of said prealloyed rare earth particulate materials or from the fresh surfaces generated during attrition,
   c. separating any contaminants thus removed from the deaggregated particulates,
   d. removing the protective fluid blanket from the thus decontaminated deaggregated particulates using vacuum distillation,
   e. desorbing the surface of the said particulates by applying a sufficiently high vacuum,
   f. allowing a predetermined volume of a suitable surfactant to adsorb onto the surface of the said particulates such that at least 25% and at most 50% of the said particulates' surface is coated with a monolayer of surfactant,
   g. dispersing said partially surfactant-coated particulates in a predetermined volume of a suitable degradable thermoplastic binder to form a homogeneous thermoplastic compound,
   h. shaping said thermoplastic compound into green preforms in a magnetic field,
   i. dewaxing and sintering said green preforms in accordance with prior art practice.

2. The method of claim 1 whereby the said green preforms are blanked from a cast tape.

3. The method of claim 2 whereby the said thermoplastic compound contains at least one UV curable ingredient.

4. The method of claim 1 whereby the said green preforms are extruded.

5. The method of claim 4 whereby the extrusion nozzle is located in a magnetic field.

6. The method of claim 1 whereby the said green preforms are injection molded in a mold cavity subjected to a magnetic field.

7. The method of claim 1 whereby the said prealloyed magnetic materials are selected from the class of rare earth magnetic alloys such as $Sm_2Co_{17}$; $SmCo_5$; $Nd_2Fe_{14}B$; $Sm_2Fe_{17}N_3$, or blends of these alloys with other alloys such as ferrites and the like.

* * * * *